United States Patent
Wang et al.

(10) Patent No.: US 10,689,569 B2
(45) Date of Patent: Jun. 23, 2020

(54) OVERCOATING INORGANIC QUANTUM DOT AND METHOD FOR PREPARING THE SAME

(71) Applicant: Taiwan Hopax Chemicals Mfg. Co., Ltd., Kaohsiung (TW)

(72) Inventors: Hung-Chia Wang, Kaohsiung (TW); An-Cih Tang, Kaohsiung (TW); Hsin-Yu Tsai, Kaohsiung (TW); Ru-Shi Liu, Kaohsiung (TW); Ping-Hung Lin, Kaohsiung (TW); Wen-Wei Chien, Kaohsiung (TW); Li-Jane Her, Kaohsiung (TW)

(73) Assignee: Taiwan Hopax Chemicals Mfg. Co., Ltd., Kaohsiung (TW)

( * ) Notice: Subject to any disclaimer, the term of this patent is extended or adjusted under 35 U.S.C. 154(b) by 404 days.

(21) Appl. No.: 15/655,904

(22) Filed: Jul. 21, 2017

(65) Prior Publication Data
US 2018/0037815 A1   Feb. 8, 2018

Related U.S. Application Data

(60) Provisional application No. 62/371,215, filed on Aug. 5, 2016.

(51) Int. Cl.
| | |
|---|---|
| C09K 11/66 | (2006.01) |
| C09K 11/02 | (2006.01) |
| B82Y 20/00 | (2011.01) |
| B82Y 40/00 | (2011.01) |

(52) U.S. Cl.
CPC ......... *C09K 11/665* (2013.01); *C09K 11/025* (2013.01); *B82Y 20/00* (2013.01); *B82Y 40/00* (2013.01); *Y10S 977/774* (2013.01); *Y10S 977/812* (2013.01); *Y10S 977/892* (2013.01); *Y10S 977/95* (2013.01); *Y10S 977/952* (2013.01)

(58) Field of Classification Search
CPC .......................... C09K 11/665; C09K 11/025
See application file for complete search history.

(56) References Cited

U.S. PATENT DOCUMENTS

10,074,770 B2 *   9/2018   Park .................. H01L 33/28
2017/0346024 A1 *   11/2017   Lee .................. B01J 13/06

FOREIGN PATENT DOCUMENTS

CN           107474821          12/2017

OTHER PUBLICATIONS

"Office Action of China Counterpart Application," dated Jul. 3, 2019, p. 1-p. 5.

* cited by examiner

*Primary Examiner* — Matthew E. Hoban
(74) *Attorney, Agent, or Firm* — JCIPRNET

(57) ABSTRACT

An overcoating inorganic quantum dot and a method for preparing the same are provided. The overcoating inorganic quantum dot includes at least one perovskite quantum dot with an oxide overcoat. The method includes forming the perovskite quantum dots, and overcoating an oxide overcoat on the perovskite quantum dots.

8 Claims, 4 Drawing Sheets

OVERCOATING INORGANIC QUANTUM DOT AND METHOD FOR PREPARING THE SAME

CROSS-REFERENCE TO RELATED APPLICATION

This application claims the priority benefit of U.S. provisional application Ser. No. 62/371,215, filed on Aug. 5, 2016. The entirety of the above-mentioned patent application is hereby incorporated by reference herein and made a part of this specification.

BACKGROUND OF THE INVENTION

1. Field of the Invention

The present invention generally relates to quantum dot technology, in particular, to an overcoating inorganic quantum dot and a method for preparing the same.

2. Description of Related Art

Recently quantum dot technology is applied in the electric device such as smart phone, TV, tablet and Apple Watch because of the advantages of high resolution, color saturation, lower power consumption and flexibility. Moreover, the potential application field will be in LED used in backlight device or collocated with Laser for a very multivariate study. The most commercialize quantum dots are cadmium selenide (CdSe), copper indium sulfide series ($CuInS_2$) and indium phosphide (InP). CdSe quantum dot system has been studied for years, due to the core shell structure and turntable wavelength, high quantum yield and narrow Full-Width Half-Maximum (FWHM), it has best performance in application when compares with other kinds of quantum dots. The turntable wavelength core (e.g., CdSe, CdS, InP and so on) by turning the quantum confinement and quantum dot is synthesized first, and then the shell is coated thereon to improve the stability. The most popular shell material in Cd series quantum dot is CdS or ZnS.

However, core-shell type CdSe has to be synthesized under the temperature over 300° C. with long reaction time, the reaction condition therefore restricts the massive production of CdSe, developing a simple and low temp reaction becomes the tendency in quantum dot study.

In recent, an all-inorganic, no cadmium included perovskite quantum dot system has been developed. The general chemical composition of such inorganic quantum dot is $CsPbX_3$ (X represents Cl, Br, or I). However, the halide atom and lead have less binding in all-inorganic perovskite system which results in poor thermal stability and easy aggregation.

SUMMARY OF THE INVENTION

Accordingly, the present invention is directed to an overcoating inorganic quantum dot for improving the stability of the quantum dot.

The present invention is also directed to a method for preparing the above overcoating inorganic quantum dot with good thermal stability.

An exemplary embodiment of the present invention includes an overcoating inorganic quantum dot comprises at least one perovskite quantum dot with an oxide overcoat.

According to one embodiment of the invention, the perovskite quantum dot is $CsPb(Cl_xBr_{1-x-y}I_y)_3$, x=0-1, y=0-1, and x+y≤1.

According to one embodiment of the invention, the oxide overcoat is $In_2O_3$.

According to one embodiment of the invention, the overcoating inorganic quantum dot has an average particle size of 8-100 nm.

Another exemplary embodiment of the present invention includes a method for preparing an overcoating inorganic quantum dot. The method includes forming a plurality of perovskite quantum dots and then overcoating an oxide overcoat on at least one of the perovskite quantum dots for forming the overcoating inorganic quantum dot.

According to another embodiment of the invention, the perovskite quantum dot is $CsPb(Cl_xBr_{1-x-y}I_y)_3$, x=0-1, and y=0-1.

According to another embodiment of the invention, the oxide overcoat is $In_2O_3$.

According to another embodiment of the invention, after overcoating the oxide overcoat, the overcoating inorganic quantum dot is further purified.

According to another embodiment of the invention, before forming the plurality of perovskite quantum dots, a Cs-Oleate precursor is prepared.

According to another embodiment of the invention, the step of forming the plurality of perovskite quantum dots comprises using the Cs-Oleate precursor.

According to another embodiment of the invention, the step of overcoating the oxide overcoat comprises adding a reactant of indium(III) acetate and oleylamine.

It is to be understood that both the foregoing general description and the following detailed description are exemplary, and are not intended to limit the scope of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
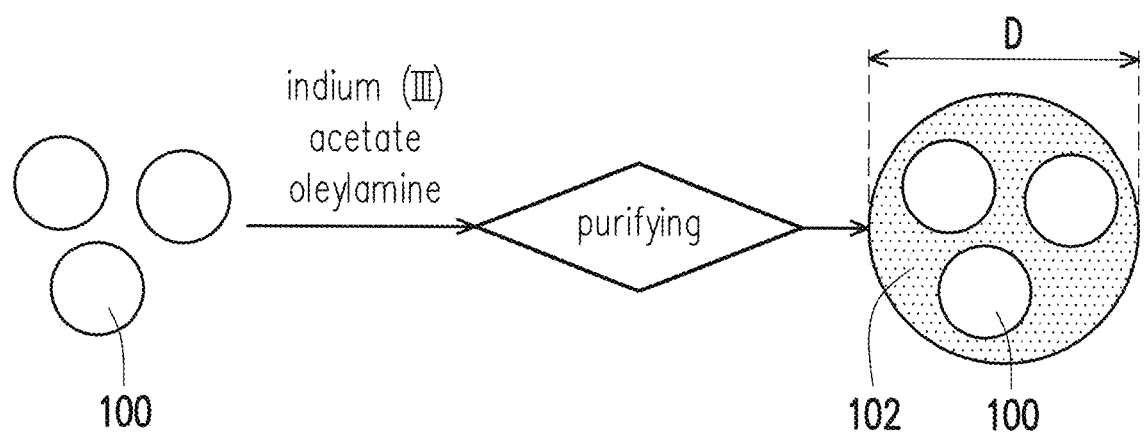
FIG. 1 is a schematic diagram illustrating a specific embodiment of preparing the overcoating inorganic quantum dot in accordance with this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram illustrating a specific embodiment of preparing the overcoating inorganic quantum dot in accordance with this invention.

With reference to FIG. 1, the overcoating inorganic quantum dot is a plurality of perovskite quantum dots 100 with an oxide overcoat 102, wherein the overcoating inorganic quantum dot, for instance, has an average particle size D of 8-100 nm; preferably 8-80 nm. In one embodiment, the perovskite quantum dot 100 is $CsPb(Cl_xBr_{1-x-y}I_y)_3$, wherein x=0-1, y=0-1, and x+y≤1. In one embodiment, the oxide overcoat 102 is metal oxide such as $In_2O_3$.

In FIG. 1, there are three perovskite quantum dots 100 contained in the oxide overcoat 102, but this invention is not limited thereto. In other embodiment, only one perovskite quantum dots 100 may be included in the oxide overcoat 102. In yet another embodiment, a large number of perovskite quantum dots 100 may be included in the oxide overcoat 102.

The preparation of the overcoating inorganic quantum dot includes forming perovskite quantum dots 100 and then overcoating an oxide overcoat 102 on the perovskite quantum dots 100 as shown in FIG. 1. In one embodiment, before forming the perovskite quantum dots 100, a Cs-Oleate precursor is prepared so as to use the Cs-Oleate precursor with the reactant of $PbX_2$ (X represents Cl, Br, or I) and oleylamine for synthesizing the perovskite quantum dots 100. In one embodiment, the step of overcoating the oxide overcoat 102 may add a reactant of indium(III) acetate and oleylamine. After overcoating the oxide overcoat 102, a purifying is optionally performed on the overcoating inorganic quantum dot.

The following describes experiments carried out in order to verify the effect of this invention. However, the scope of this invention is not limited to the following experiments.

Experimental Example: Synthesis of Overcoating Inorganic Quantum Dot

Step a. Preparing a Cs-Oleate Precursor 0.814 g $Cs_2CO_3$ was mixed with 40 mL octadecene (ODE) and 2.5 mL oleic acid to react under 120° C. and vacuum condition for one hour, then the mixture was heated to 150° C. in $N_2$ atmosphere until $Cs_2CO_3$ and ODE reacted completely to obtain the Cs-Oleate precursor.

Step b. Preparing Precursor of $In_2O_3$ 100 mg indium(III) acetate was reacted with 5 mL oleylamine in 120° C. for 30 min and kept in 120° C. in order to use as the precursor of $In_2O_3$.

Step c. Synthesis of $CsPbBr_3$ Quantum Dots 5 ml ODE and 0.188 mmol $PbBr_2$ were mixed and then heated to 120° C. under vacuum for 1 hr. Thereafter, 0.5 mL oleylamine and 0.5 mL ODE were added to the mixture.

After above reactant was dissolved completely, it was heated to 140-200° C. under $N_2$ atmosphere. 0.4 mL of the Cs-Oleate precursor obtained in Step a was added into the reactant, and then the mixture was cooled down to 120° C. to obtain the suspension of $CsPbBr_3$ quantum dots.

Step d. Synthesis of the Overcoating Inorganic Quantum Dot

The precursor of $In_2O_3$ obtained in Step b was added in to the suspension of $CsPbBr_3$ in Step c. After one-hour reaction, this solution was cooled down in ice, and t-butanol was added into it (volume ratio=1:1) to purify the overcoating inorganic quantum dot.

Figure 2A:
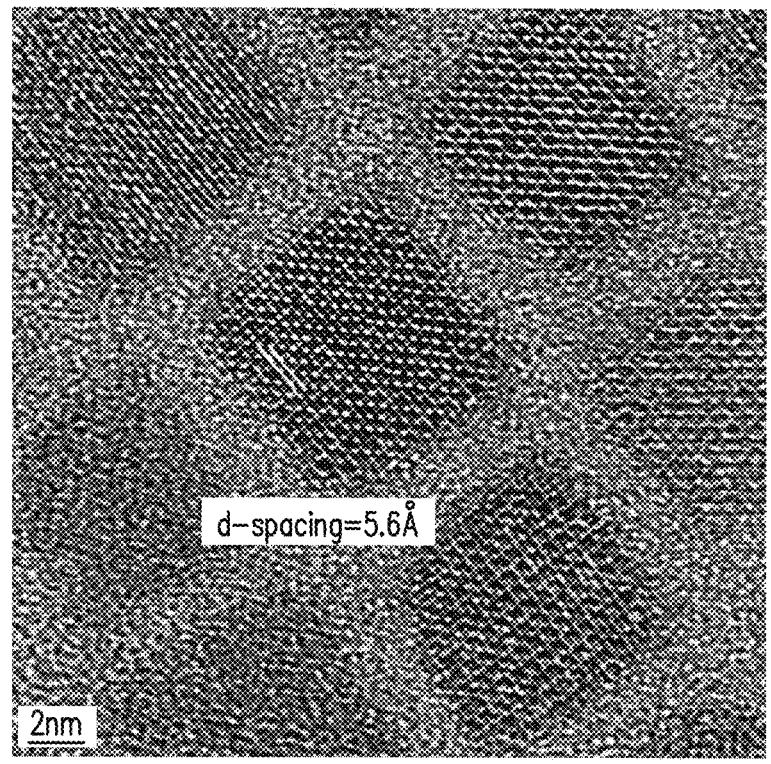
FIG. 2A and FIG. 2B are transmission electron microscopy (TEM) photographs of experimental example in different magnification according to this invention.
Figure 2B:
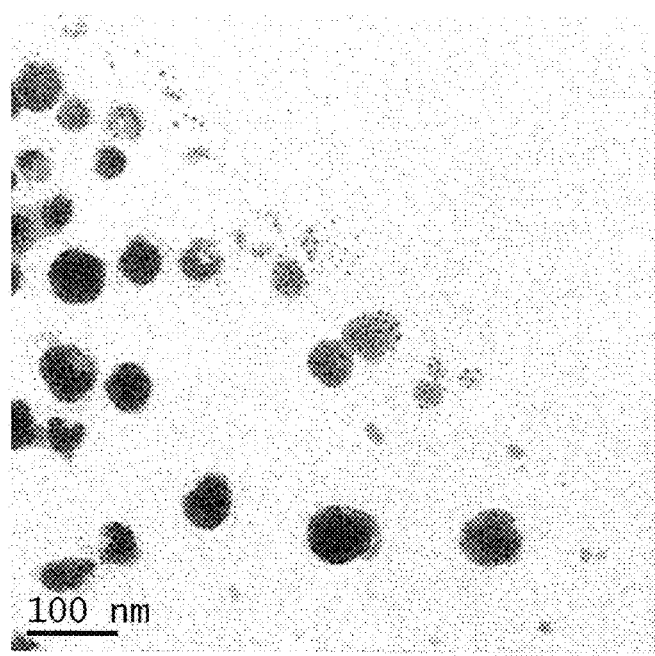

FIG. 2A and FIG. 2B are TEM photographs of the product of experimental example in different magnification. It is determined from FIG. 2A that lattice constant of the overcoating inorganic quantum dot is 5.6 Å and its grain size is around 10 nm. Furthermore, in FIG. 2B, it is shown that the particle size of the overcoating inorganic quantum dot is about tens of nanometer, and it is clear that a number of perovskite quantum dots (i.e. black points) is contained in single oxide overcoat (i.e. grey portion).

Comparative Example

The Steps a and c of the experimental example were performed to prepare $CsPbBr_3$ as comparative example.

Detection

The comparisons between experimental example and comparative example was as below.

Figure 3:
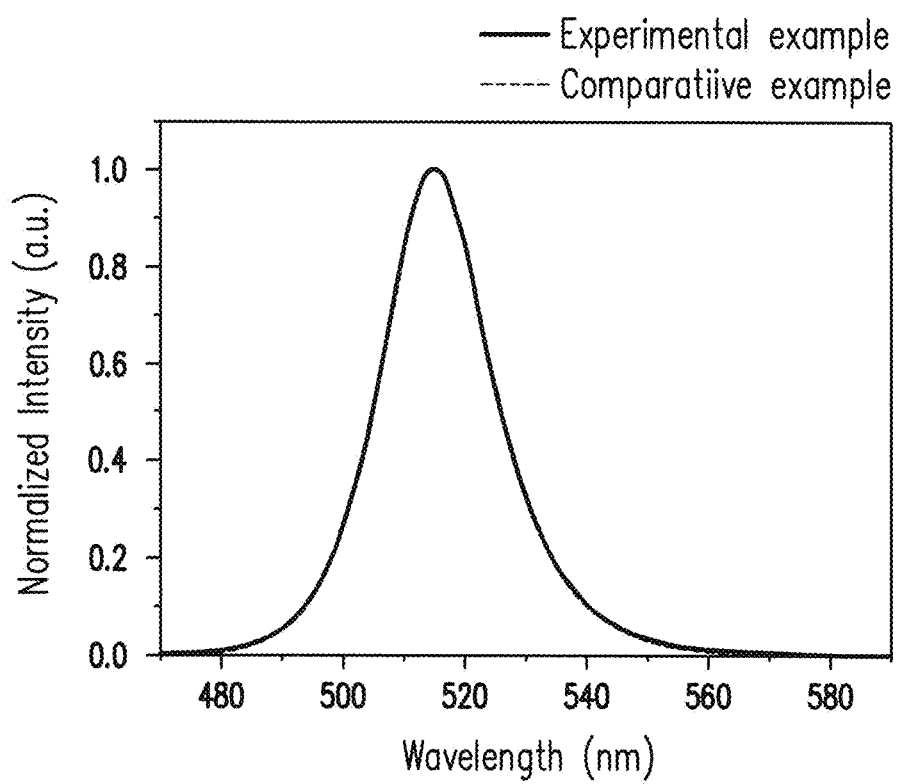
FIG. 3 is an emission spectrum of experimental example and comparative example.

As shown in FIG. 3, the FWHM and emission wavelength of experimental example and comparative example are almost the same, and thus they are not distinguished each other in FIG. 3. The emission peak of experimental example is 514 nm, and the FWHM of experimental example is 18 nm. The emission peak of comparative example is 515 nm, and the FWHM of comparative example is 20 nm.

Figure 4:
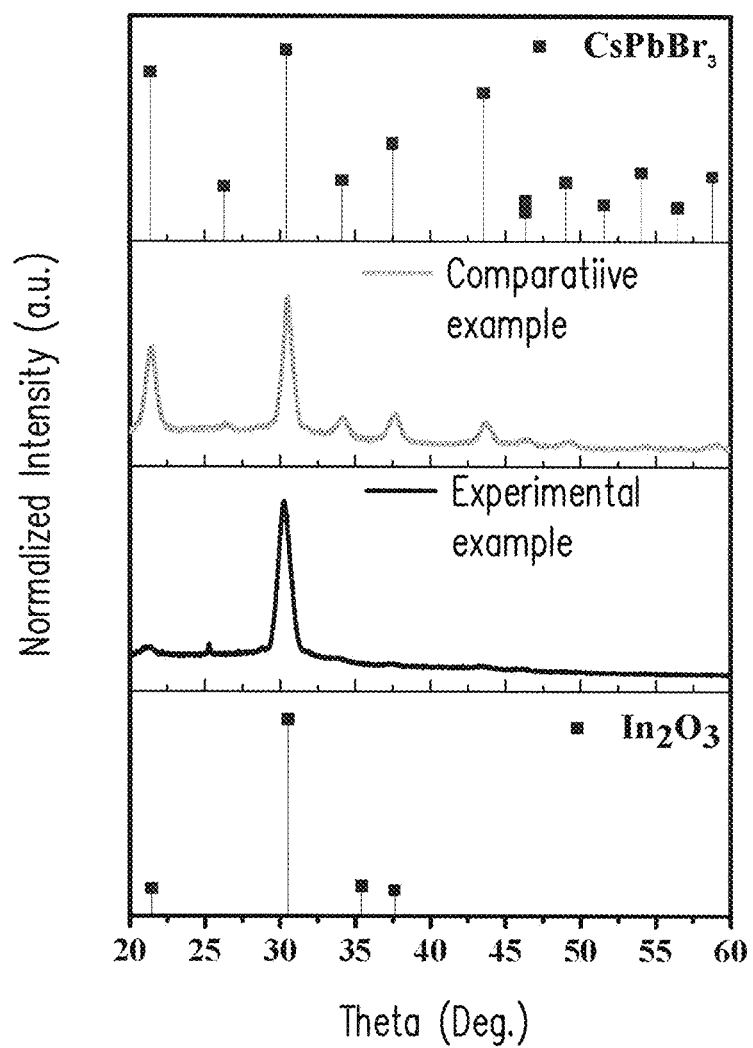
FIG. 4 is XRD curves of experimental example and comparative example with standard $CsPbBr_3$ and $In_2O_3$.

FIG. 4 is XRD curves of experimental example and comparative example with standard $CsPbBr_3$ and $In_2O_3$. In FIG. 4, the top spectrum is the XRD of standard $CsPbBr_3$, and the bottom spectrum is the XRD of standard $In_2O_3$. The major peak for experimental example was contributed by $In_2O_3$, and thus the peak of $CsPbBr_3$ was a little inconspicuous. The peak of $CsPbBr_3$ in the experimental example shifted from 2θ=30.49 to 2θ=30.28°.

Figure 5A:
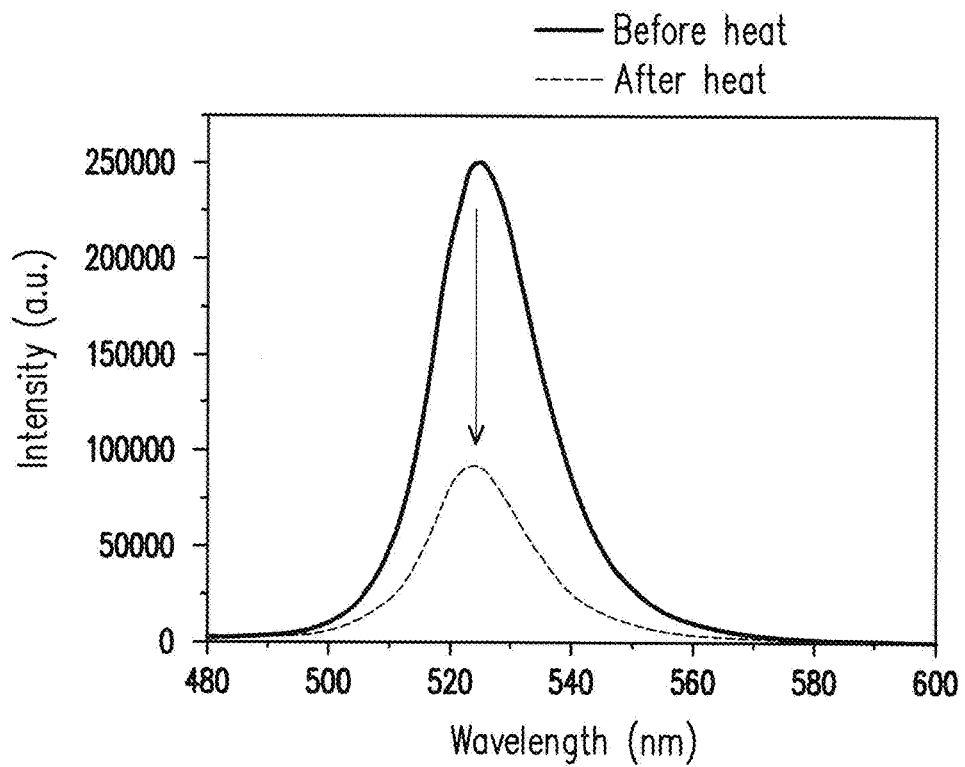
FIG. 5A shows the thermal stability of comparative example.
Figure 5B:
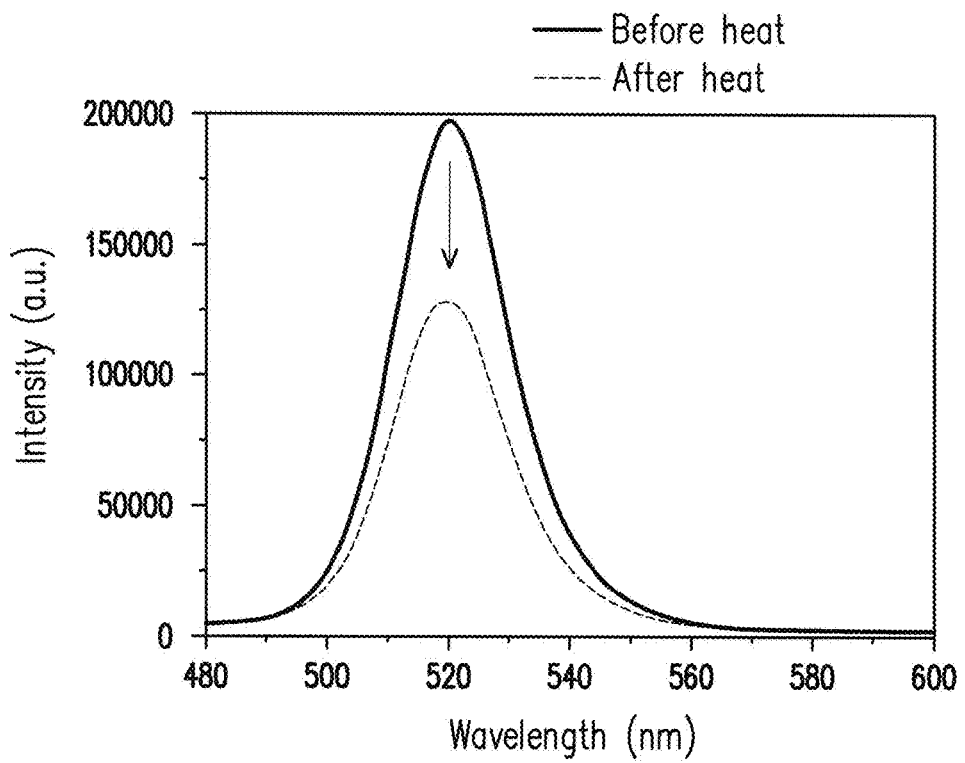
FIG. 5B shows the thermal stability of experimental example in accordance with this invention.

FIGS. 5A and 5B show comparison of the thermal stability of the experimental example and comparative example. The emission intensity of experimental example is improved from 35% ($CsPbBr_3$ without $In_2O_3$ overcoat) to 65% after being heated under 100° C. for 10 mins. This is the evidence that the perovskite is overcoated by $In_2O_3$.

In summary, according to this invention, the perovskite quantum dots have the oxide overcoat, and thus the thermal stability of the overcoating inorganic quantum dot is improved extremely. Moreover, the perovskite quantum dots and the oxide overcoat may be prepared under 300° C., and thus it may be useful to the massive production.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An overcoating inorganic quantum dot, comprising:
   a plurality of perovskite quantum dots being contained in a single oxide overcoat, wherein the oxide overcoat is $In_2O_3$.

2. The overcoating inorganic quantum dot according to claim 1, wherein the perovskite quantum dot is $CsPb(Cl_xBr_{1-x-y}I_y)_3$, x=0-1, y=0-1, and x+y≤1.

3. The overcoating inorganic quantum dot according to claim 1, wherein the overcoating inorganic quantum dot has an average particle size of 8-100 nm.

4. A method for preparing an overcoating inorganic quantum dot, comprising:
   forming a plurality of perovskite quantum dots; and
   adding a reactant of indium(III) acetate and oleylamine to overcoat an oxide overcoat on at least one of the perovskite quantum dots for forming the overcoating inorganic quantum dot, wherein the oxide overcoat is $In_2O_3$.

5. The method according to claim 4, wherein the perovskite quantum dot is $CsPb(Cl_xBr_{1-x-y}I_y)_3$, x=0-1, and y=0-1.

6. The method according to claim 4, further comprising purifying the overcoating inorganic quantum dot after overcoating the oxide overcoat.

7. The method according to claim 4, further comprising preparing a Cs-Oleate precursor before forming the plurality of perovskite quantum dots.

8. The method according to claim 7, wherein forming the plurality of perovskite quantum dots comprises using the Cs-Oleate precursor.

\* \* \* \* \*